(12) United States Patent
Bojanic

(10) Patent No.: US 6,370,151 B1
(45) Date of Patent: Apr. 9, 2002

(54) METHOD OF PROVISIONING NODES WITHIN A COMMUNICATIONS NETWORK

(75) Inventor: Alexander Bojanic, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/172,997

(22) Filed: Oct. 16, 1998

(30) Foreign Application Priority Data

Dec. 31, 1997 (CA) .............................................. 2226063

(51) Int. Cl.[7] .............................................. H04L 12/28
(52) U.S. Cl. ...................................................... 370/426
(58) Field of Search ................................ 370/250, 251, 370/389, 395, 398, 399, 422, 423, 424, 425, 426, 410, 522, 524; 379/9, 12, 14, 15, 16, 17, 22, 23; 709/238, 242, 244

(56) References Cited

U.S. PATENT DOCUMENTS

| | | | |
|---|---|---|---|
| 5,541,911 A | * | 7/1996 | Nilakantan et al. ......... 370/422 |
| 5,875,242 A | * | 2/1999 | Glaser et al. ............... 379/207 |
| 5,909,682 A | * | 6/1999 | Cowan et al. ................. 707/9 |
| 5,914,798 A | * | 6/1999 | Liu ............................. 359/161 |
| 5,953,338 A | * | 9/1999 | Ma et al. ..................... 370/395 |

* cited by examiner

Primary Examiner—Kwang B. Yao (57) ABSTRACT

A method of provisioning a local number portability capable communication network which comprises numerous service provider networks, with updated signalling routing information to reflect a porting change is disclosed. A central administration center first updates the ported to network with updated signalling routing information. After the ported to network has been successfully updated the central administration center then proceeds to update all intermediate service provider networks. After confirmation has been received that all intermediate networks have been successfully updated the central administration center then proceeds to update the ported from network. Provisioning of networks which include intermediate networks supported by a central administration center in the predetermined manner and sequence disclosed can advantageously prevent signalling messages from looping between non-synchronized networks. The provisioning sequence works equally well where only two networks are involved, i.e. the ported from and ported to networks.

6 Claims, 7 Drawing Sheets

METHOD OF PROVISIONING NODES WITHIN A COMMUNICATIONS NETWORK

FIELD OF INVENTION

This invention relates to provisioning nodes within a telecommunications network and in particular to updating nodes with new signalling routing data for local number portability applications.

BACKGROUND TO THE INVENTION

Local Number Portability (LNP) is a new capability or service that allows end-users of telecommunications services to retain their existing telephone directory number (DN) when for example they either change from one geographic location to another or change from one service provider to another.

Local Number Portability (LNP) will likely be a service which will be ubiquitous throughout telecommunications networks. The United States is likely ahead of most other LNP interested countries in its deployment of LNP and as a consequence is experiencing first hand many of the problems associated with such a network impacting service.

It is generally realized that service providers (SP) and other interested groups will have to co-operate in defining how LNP will be implemented across a larger overall network which is made up of possibly many individually owned Service Provider networks. One such interested group are participants of the Illinois Commerce Commission (ICC) Workshop on Local Number Portability.

Of particular concern to this group is how various nodes within each of the networks will be updated with new addressing information which correctly points to where a ported subscriber can now be found within the network. This functionality generally is referred to as LNP Global Title Translation (GTT) function and must exist in a network that supports LNP to properly route signalling messages (e.g. Signalling System Number 7 (SS7) messages) that had prior to LNP, previously relied on simple six digit (NPA-NXX) GTT routing. The LNP GTT function is needed throughout the network to support services that use SS7 signalling and that are impacted by LNP. The LNP GTT function is needed when services that rely upon SS7 signalling are to be supported between networks, or whenever more than one switch supports a given NPA-NXX. The LNP GTT function may be provided by an SCP that also provides the LNP application or the function may reside elsewhere in the network.

The ICC workshop participants and industry have proposed that information about ported subscribers will be made available to Service Control Points (SCPs) supporting the LNP application from a central co-ordinator called a Number Portability Administration Center (NPAC). The terms Central LNP Administration Center and Number Portability Administration Center (NPAC) are used interchangeably in this specification. The LNP GTT function will also receive information about ported subscribers from the NPAC. The LNP SCP and LNP GTT functions are expected to be supported by a local network Service Management System (SMS) function that will provide the interface to the NPAC. However with the introduction of LNP, all LNP capable networks are going to require a ten-digit GTT node to support for example Line Information Data Base (LIDB) and Custom Local Area Signalling Services (ClASS) services as the NPA-NXX of a dialled number may not uniquely identify the targeted network element. It is also appreciated that when the NPAC broadcasts updates to all LNP capable networks there exists the potential for signalling messages to loop between networks where one network has had its GTT node(s) updated before another. If a call is encountered during this interval when network GTT nodes are not synchronized, SS7 message looping is likely to occur and will cause SS7 network congestion or possibly even network failure. The problem of non synchronized GTT nodes exists simply because GTT nodes across the network can not all be provisioned simultaneously.

Various options for dealing with looping messages have been proposed in the ICC LNP workshop final draft titled "Generic Requirements for SCP Application and GTT Function for Number Portability (Issue 0.99, Jan. 6, 1997), which is herein incorporated by reference in its entirety. Of the thirteen options discussed in Annex A of the final draft all but one address the issue of looping only after looping has started. However the third proposal suggests at a high level, a network provisioning method to prevent looping prior to it starting. However as is outlined in the ICC Final draft the participants have stated that such a method had two major flaws; first that it "will not protect against looping, when a transport (intermediate) network is used that performs GTT, without following an operational protocol"; and secondly that "this operational protocol does not currently exist".

There are significant advantages and thus there is a need to prevent the start of looping of LNP associated signalling messages between networks which include intermediate signalling network(s).

SUMMARY OF INVENTION

The invention seeks to provide a method of provisioning LNP nodes in networks which include intermediate networks which mitigates the above known problems.

In accordance with a first aspect of the invention for a communications network comprising a plurality of service provider networks each supported by and communicating with a central administration center over separate communication links, there is provided a method of provisioning the communications network with updated signalling routing data comprising the steps of: in response to receiving a porting request to port a directory number (DN) served by a first Service Provider network to a second Service Provider network, the central administration center over respective communication links first sending updated signalling routing data reflecting the porting change toward the second Service Provider network;

in response to receiving a confirmation message that the second Service Provider network has been updated with the routing data, the central administration center over respective communication links then sending updated routing data reflecting the porting change toward at least one intermediate Service Provider network; and in response to receiving a confirmation message that each intermediate Service Provider network has been updated with signalling routing data, the central administration center over a communication link then sending updated signalling routing data reflecting the porting change toward the first Service provider network.

In accordance with a second aspect of the invention for a communications network comprising two or more service provider networks, a central administration center, and a local service management system for each service provider network disposed between the central administration center and the respective service provider network for providing a communication interface there between, there is provided a method of provisioning a service provider network with updated signalling routing data comprising the step of: in response to a service management system receiving a message from the central administration center comprising updated signalling routing data reflecting a porting change and a sequence number associated with the message the service management system after updating the respective service provider network with the updated signalling routing data, sending a confirmation message which includes the sequence number associated with the received message to the central administration center for tracking purposes.

Sequential provisioning of networks in accordance with the invention advantageously mitigates the problem of signalling messages looping while networks are in a non synchronized state. The method proposed works equally well where one or more intermediate networks are involved. Significant savings can be realized to service providers as little or no development is required at the network element level.

BRIEF DESCRIPTION OF THE DRAWINGS

The invention will be further understood with reference to the drawings in which.

DETAILED DESCRIPTION OF THE PRESENTLY PREFERRED EMBODIMENT

Figure 1:
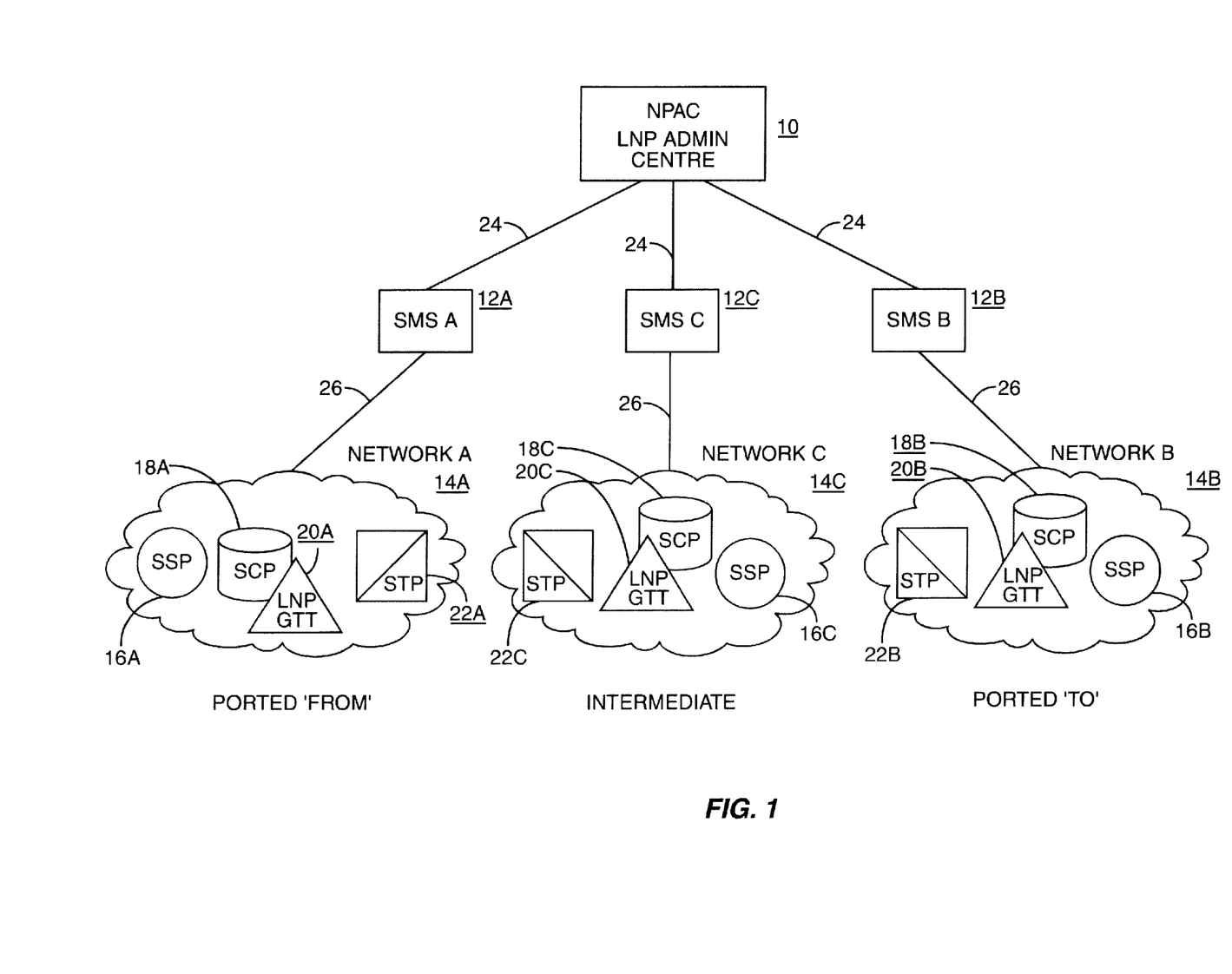
FIG. 1 illustrates a proposed architecture for administrating and monitoring a larger LNP capable network comprised of numerous Service Provider networks.

FIG. 1 illustrates a preliminary proposal by the ICC Workshop on Local Number Portability of an architecture for administrating and monitoring a larger LNP capable network which is comprised of numerous LNP capable Service Provider networks. Three separate service provider networks, Network A, B and C are represented within clouds 14A, 14B, 14C respectively in FIG. 1. Each network comprises well known network functionality such as Service Switching points (SSP) 16A, B, C, Signal Transfer Points (STP) 22A, B, C and Service Control Points (18A, B, C). Included in each of the three Networks 14A, B, C is a LNP GTT function 20A, B, C which although shown separately may be provided by an SCP that also provides the LNP application or the function may reside elsewhere in the network. Each network 14A, B, C is connected over proprietary links 26 to respective local Service Management System (SMS) 12A, B, C which are the operations and support system for Advanced Intelligent Networks (AIN) and which provide the mechanism for downloading new features and monitoring of the AIN. A central LNP administration center 10, referred to as a Number Portability Administration Center (NPAC) by the ICC is shown connected over links 24 to respective local network SMSs 12A, B, C.

Figure 2:
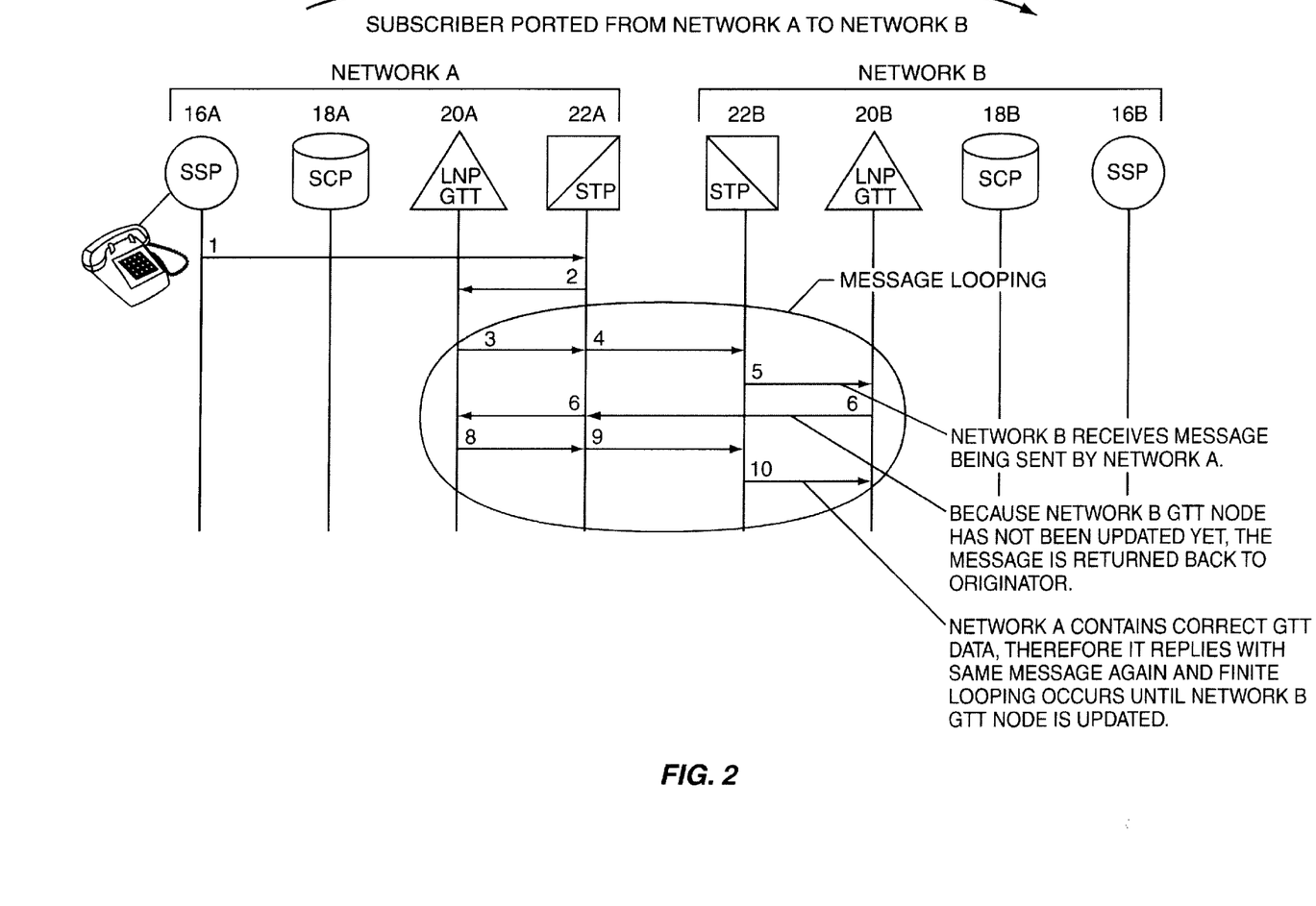
FIG. 2 illustrates a signalling call flow between two networks A & B and where one network is updated with new routing information prior to the other.

In operation it is proposed that the central administration center, (NPAC 10) will make available information about ported subscribers to the local networks 14A, B, C via a broadcast over links 24 to respective local network SMSs 12A, B, C. Local network SMSs 12A, B, C will in turn update their respective nodes within their own networks over proprietary links 26. FIG. 2 illustrates the problem identified by the ICC participants of looping signalling messages between networks that can occur where the NPAC 10 broadcasts updates to all LNP capable networks and where one network has had its GTT node(s) updated before another. FIG. 2 represents a signalling call flow between Network A (14A) and Network B (14B) for a subscriber who has switched from being served by the SP of Network A to the SP of Network B. In FIG. 2 it is to be assumed that Network A, the 'Ported From' network has had its local GTT function 20A updated with new 10 digit GTT data to reflect this porting change and that Network B, the 'Ported To' network has not yet had it's local GTT function 20B updated. It is during this unsynchronized state that looping of LNP messages can occur as will now be described with reference to FIG. 2. The Service Switching Point (SSP) 16A generates (Step 1) for example a CLASS query message for the directory number (DN) 613-761-1234, of a ported subscriber now served by a CLASS system in Network B (14B). The SSP 16A formulates the query with the STP 22A point code and codes the GTT data as the NPA-NXX of the number queried (e.g. 613-761).

The STP receives the query (Step 2) and looks up the GTT in its six-digit GTT table. Since 613 761 is marked as a portable NPA-NXX, only partial GTT will be performed to forward the message to the LNP GTT node 20A for further translation.

The LNP GTT node 20A (likely part of SCP 18A) decodes the message (Step 3) and checks to see if there is a ten-digit translation for the directory number (DN) in the message. If all ten digits in the DN match a GTT table entry, the corresponding GTT data is used to route the message. In this case, the ported number is served by another network and a partial ten-digit GTT is used (with updated GTT data) to route the message to the STP 22B at Network B (Step 4).

Network B examines the message (Step 5) and in a similar manner to Step 4 attempts to perform another ten-digit GTT to determine the ultimate destination of the message. Since the subscriber is within Network B, a final ten-digit GTT should be performed at this point. However in this example Network B has not had its local GTT function 20B updated with new 10 digit GTT data to reflect the porting change and hence Network B using old GTT data returns an error message to Network A (Step 6). The STP 22A in Network A receives the returned message (Step 7) and as in Step 2 forwards the translated message to the LNP GTT node 20A for further translation. Steps 8, 9 and 10 are essentially the same steps as Steps 3, 4 and 5 respectively and effectively routes the message back to Network B since Network A has been made aware of the porting change and has had its LNP GTT function 20A data upgraded to reflect the change. Finite looping of signalling messages shown within the shaded oval may occur until both networks have their respective LNP GTT nodes updated and hence are synchronized.

In the example of FIG. 2, both networks must have ten-digit GTT data for the DN 613 761 1234 to prevent message looping. This data is provided by updates sent from the LNP Administration Center or NPAC 10 over links 24 to the local SMSs. If the GTT data at the GTT nodes in either network is missing or is incorrect, miss-routing or looping of SS7 messages may occur.

Figure 3:
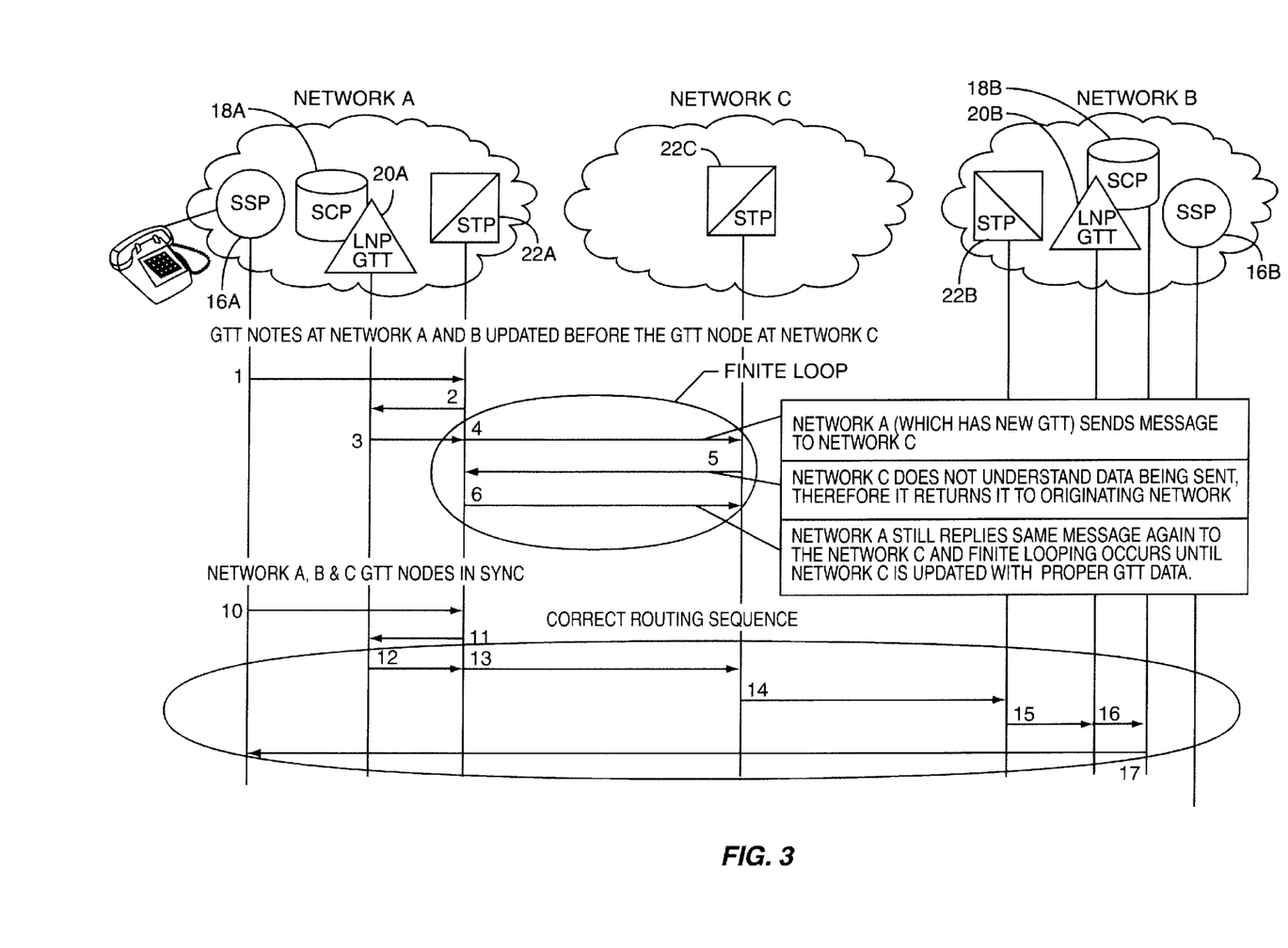
FIG. 3 illustrates signalling call flows for two routing scenarios where an intermediate Network C is required in transporting signalling messages to Network B on behalf of originating Network A.

FIG. 3 illustrates two signalling call flows for routing scenarios where an intermediate Network C is required in transporting signalling messages to Network B on behalf of originating Network A. As in FIGS. 1 and 2 it is assumed that a subscriber has ported from Network A to Network B. In the first scenario, Network A and B have had their LNP GTT nodes 20A, 20B respectively, updated with new GTT data to reflect the porting change while intermediate Network C contains GTT data not reflecting the change. In a similar manner to Steps 1–4 of FIG. 2, steps 1–4 of FIG. 3 route the signalling message based on updated LNP GTT data to the STP 22C at Network C. Network C however (only STP 22C shown) has not yet been updated and hence returns the message back to Network A (Step 5). Network A having been updated with correct LNP GTT data forwards the message (Step 6) back to Network C. Once again finite message looping will occur until all network LNP GTT nodes are synchronized.

Steps 10 through 17 of FIG. 3 illustrate a correct routing sequence through Network C resulting from all Networks being synchronized with regard to LNP GTT data. Steps 10–13 of FIG. 3, which route signalling messages from Network A to Network C, follow directly from Steps 1–4 of FIG. 3. However, Network C having been updated, now uses correct LNP GTT data to route the message at Step 14, to the STP 22B of Network B. The STP 22B at Step 15 after determining that the NPA-NXX of the DN associated with the message is marked as portable (table lookup), the STP 22B performs a partial GTT and proceeds to route (Step 15) based on this partial translation to its associated LNP GTT node 20B for further translation. The LNP GTT node 20B (shown as part of SCP 18B) decodes the message (Step 16) and checks to see if there is a ten-digit translation for the directory number (DN) contained within the message. As the DN in this example is now served by Network B, all ten digits of the DN will match a GTT table entry, and the corresponding GTT data is then used to route the message (Step 16) to the SCP 18B associated with Network B. The SCP 18B which has the service application for the subscriber associated with the DN and will correspondingly respond to the query message by sending a reply message (Step 17) containing appropriate data, back through Network C to Network A (via a Gateway STP) using updated LNP GTT data.

The invention generally proposes a method of sequentially provisioning local network LNP GTT nodes by a central LNP administration center (NPAC) to address the problem of preventing the start of looping signalling messages between networks. The provisioning method proposes updating the 'Ported To' network with updated LNP GTT data to reflect a porting change, prior to updating either the 'Ported From' or any Intermediate networks. Only after receiving confirmation from the 'Ported To' network that the update has been successfully completed does the NPAC proceed to update all Intermediate networks. The updating of the Intermediate networks may be done in a broadcast manner with the NPAC tracking all confirmation responses from the respective Intermediate networks. Only after receiving a successful confirmation response from each of the respective Intermediate networks does the NPAC proceed to update the 'Ported From' network. With the above ordered sequence of provisioning networks, looping of signalling messages can be prevented. A protocol between the central LNP administrator (NPAC) and local network SMSs is required which can manage response messages to action messages. The applicants have appreciated that although protocols can be developed to handle such functionality, that the standardized Common Management Interface Protocol (CMIP), which has already been selected by industry to define the interface between an NPAC and local SMSs, can advantageously provide the functionality required.

Figure 4:
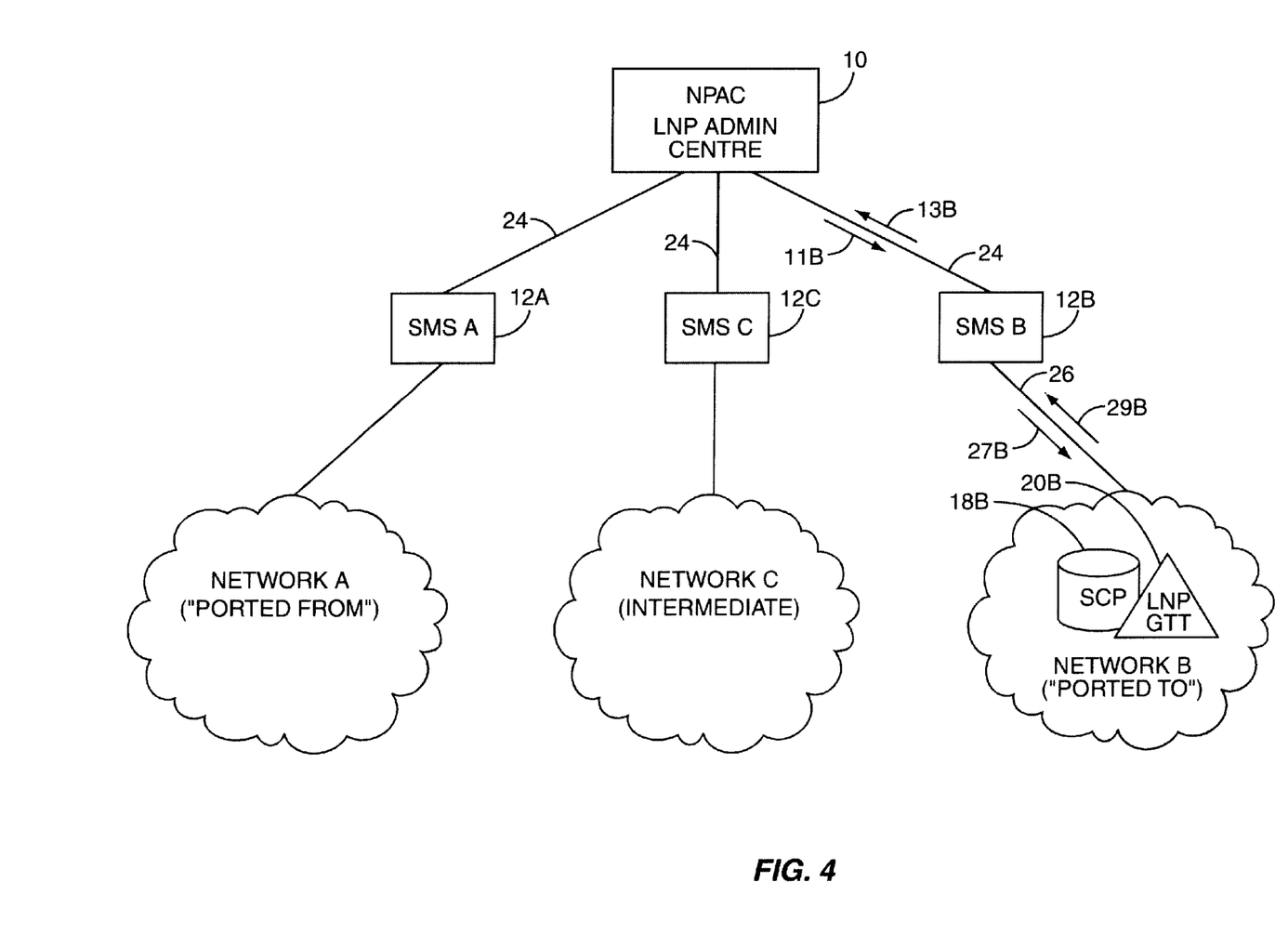
FIG. 4 illustrates a first step of a provisioning process of the architecture of FIG. 1 in accordance with an embodiment of the invention.
Figure 5:
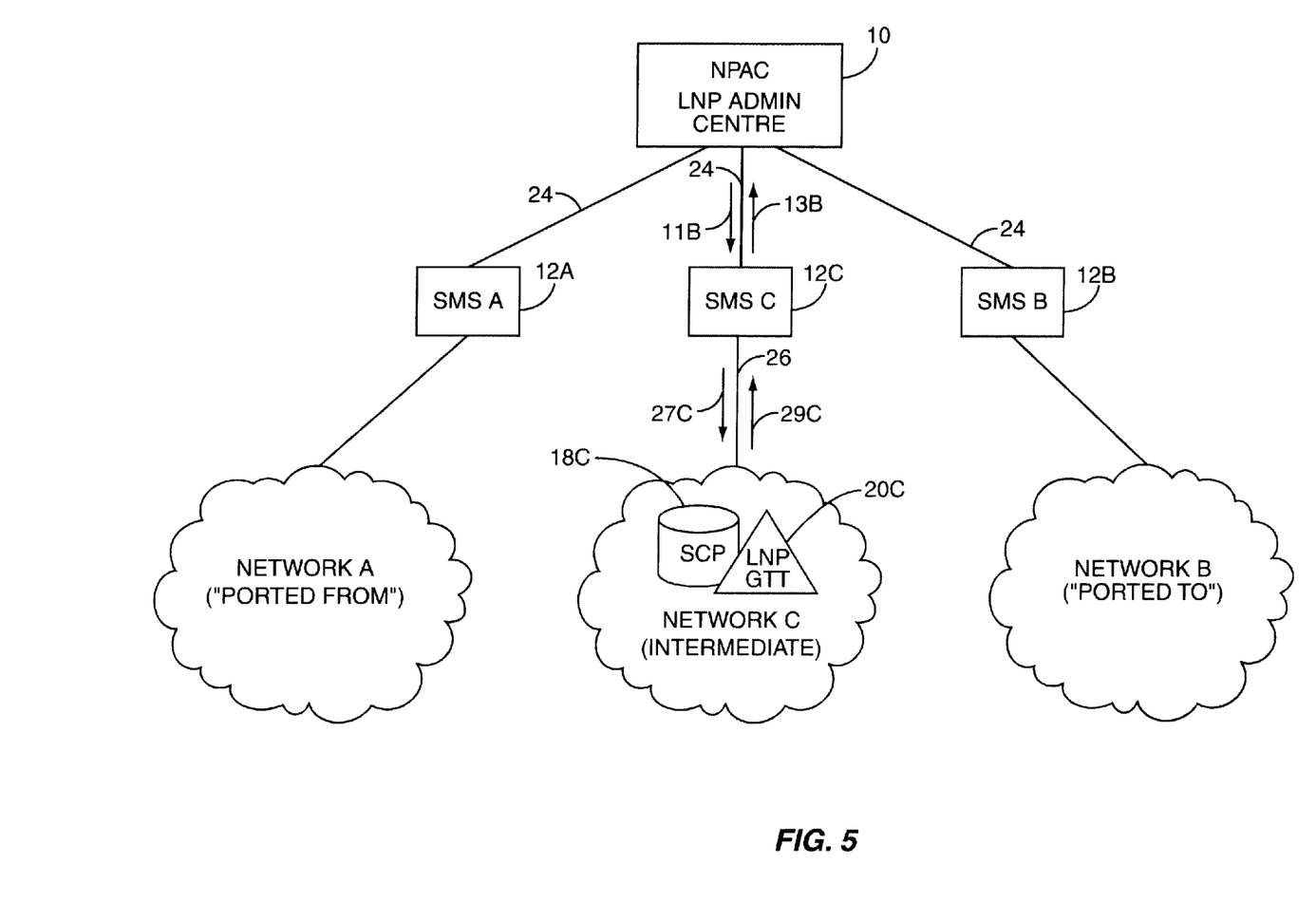
FIG. 5 illustrates a second step of a provisioning process of the architecture of FIG. 1 in accordance with an embodiment of the invention.
Figure 6:
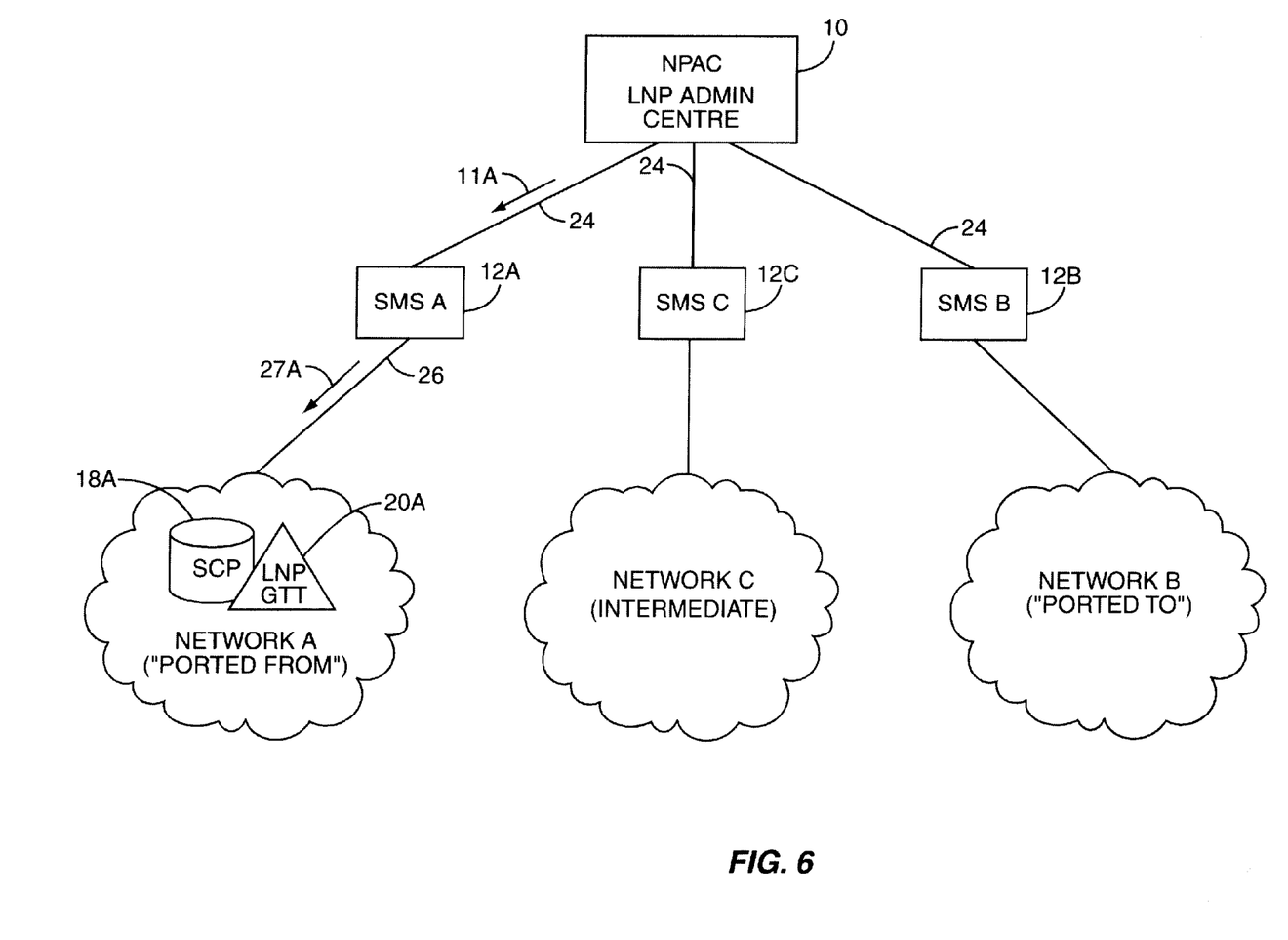
FIG. 6 illustrates a third step of a provisioning process of the architecture of FIG. 1 in accordance with an embodiment of the invention.

Now with reference to FIGS. 4, 5 and 6, an example walk through of a provisioning process in accordance with an embodiment of the invention will be described. FIGS. 4, 5, and 6 illustrate the Network architecture of FIG. 1 with local Networks A, B & C represented solely by clouds 14A, 14b, 14C respectively. However local network functionality 16, 18, 20, 22 shown in FIG. 1 is assumed to be present in FIGS. 4, 5 & 6. Network elements in the various figures identified with the same element numbers represent the same element. Communication links 24 between the LNP Administration Center 10 and local network SMSs 12A, 12B, 12C are assumed in this embodiment to support the standardized Common Management Interface Protocol (CMIP).

FIG. 4 illustrates as first step of the sequential provisioning process, first updating network B LNP GTT function or node 20B with updated LNP GTT data to reflect a porting change. The provisioning process is initiated generally with the receipt of a porting request for example by receiving a Service Order (SO). The porting request could be for example a request to port a service for a subscriber from Network A to Network B.

In response to being notified of a porting request the LNP Administration Center 10 opens a communication link over link 24 to the local SMS 12B associated with the "Ported To" network, i.e. Network B in this example. The Association Control Service Element (ACSE) protocol (a lower layer of the CMIP protocol) establishes an application-level connection, by sending in known manner a type 'A-ASSOCIATE' message to the SMS 12B. After opening the communication link, the LNP Administration Center 10 sends a CMISE/CMIP 'M-ACTION Request' message (arrow 11B) to the local SMS 12B containing; information on what actions should be performed at the SMS level (e.g. update LNP GTT data), action information (e.g. GTT data attribute list), a sequence number assigned to this data to facilitate message tracking and having the message mode flag set to indicate to the local SMS 12B that a 'M-ACTION Response' is required with an acknowledgement indicating whether the transaction was successful. At the same time, a timer for the transaction is started at the LNP Administration Center 10. Local SMS 12B processes the request and sends over proprietary link 26 the updated GTT data in a message (arrow 27B) to the LNP GTT node 20B within Network B. Although the interface between the local SMS and the LNP GTT node 20B may be vendor-specific, it preferably should be capable of supporting a database synchronization procedure with a sequence number, and the SMS preferably should be able to re-send active updates to the GTT node 20B if a negative acknowledgement is received in a confirmation message (arrow 29B) at the SMS 12B indicating that the SMSs 12B attempt to update the LNP GTT node 20B failed. When the local SMS 12B receives a positive acknowledgement in the confirmation message 29B from the LNP GTT node indicating that the transaction was successful, it generates a CMISE/CMIP 'M-ACTION Response' message 13B and sends it over link 24 to the LNP Administration Center 10 to indicate a successful transaction for this particular invoke identifier (e.g. sequence number).

However if a negative acknowledgement is received from the local SMS 12B indicating an unsuccessful GTT node update (an M-ACTION Response message sent by the local SMS 12B with an error code set to indicate processing failure), the LNP Administration Center 10 resets the timer and re-sends the GTT data associated with the original sequence number. In the case when the timer at the LNP Administration Center 10 has expired before it receives an M-ACTION Response message from the local SMS 12B, the LNP Administration Center 10 sends a 'M-CANCEL' message to cancel the transaction and returns to a procedure to verify local SMS 12B availability. After a positive reply is received from local SMS 12B, the LNP Administration Center 10 sends a new 'M-ACTION Request' message with the same GTT data.

Where a GTT node or link problem is encountered at any stage of the updating process, the respective local SMS will send an 'M-EVENT-REPORT' message to the LNP Administration Center 10 indicating the type of fault (or alarm). In this case, the LNP Administration Center stops the timer and waits until a new message is received indicating that the fault (or alarm) has been eliminated before resetting the timer and re-sending the GTT data associated with the invoke identifier.

Only after the Central Administration Center 10 receives the successful transaction or update indication, does it proceed with updating the next network in the updating sequence. Optionally the SMS 12B may return the M-Action response 13B message after it has sent message 27B over link 26 to Network B but before waiting for the return of a successful confirmation message 29B. This may occur for example where the proprietary link 26 does not support a protocol having the capability to respond with a confirmation message 29B. The SMS 12B alternatively could return the M-Action response message 13B after it has received the updated data in message 11B but before actually sending message 27B over link 26 to Network B. There is however a small probability that the NPAC 10 in proceeding to update the next network in the sequence prior to actual confirmation that a previous network LNP GTT node was successfully updated could possibly result in networks being updated out of sequence and hence the looping of signalling messages. Further more network link 26 outages and or LNP GTT node 20B outages could delay or even possibly prevent a network from being updated.

Next in the provisioning sequence after successfully updating the 'Ported To' networks LNP GTT node 20B, the LNP Administration Center 10 proceeds to update all intermediate network LNP GTT nodes. FIG. 5 illustrates a second step in the provisioning sequence of the overall larger network of FIG. 4 with the updating of a single intermediate Network C. When the LNP Administration Center 10 receives the CMISE/CMIP M-ACTION Response message (13B in FIG. 4) from the "Ported To" network (i.e. Network B) reporting that the transaction was successful, it proceeds to update the LNP GTT node 20C in the Intermediate network (Network C). The Central LNP Administration Center 10 updates the intermediate network LNP GTT node 20C in substantially the identical manner as for the 'Ported TO' networks LNP GTT node 20B of FIG. 4 as just described and hence does not require repeating.

Figure 7:
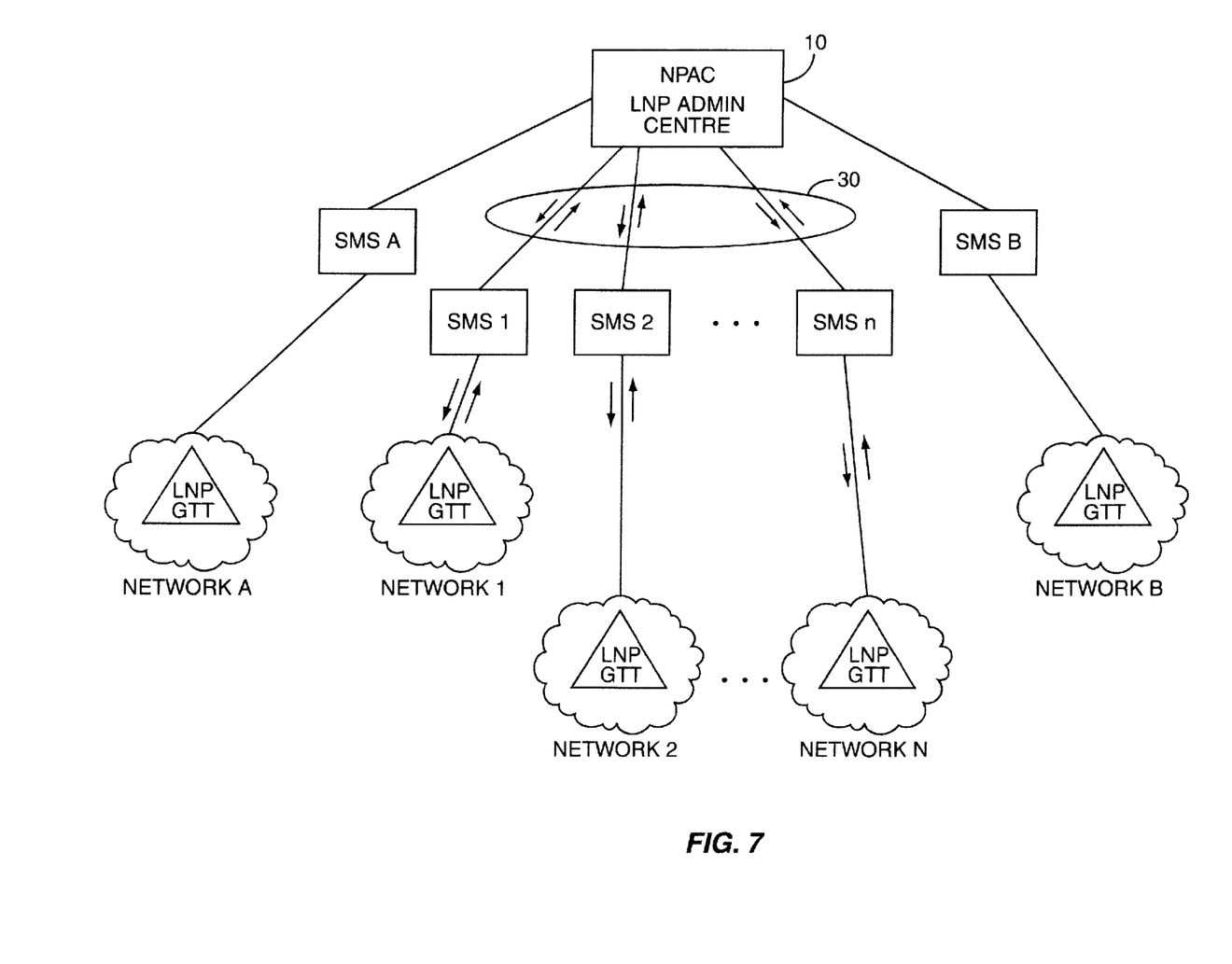
FIG. 7 illustrates the network architecture of FIG. 1 and including multiple intermediate networks.

A single intermediate network has been shown in FIG. 5 to facilitate the understanding of the updating sequence but in practice numerous intermediate networks may be part of the overall larger network and communicating with the LNP Administration Center 10. Where more than one intermediate network makes up part of the overall network, the Central LNP Administration Center 10 may broadcast substantially simultaneously, M-Action Request messages over links 26 to all corresponding local SMSs in the LNP Administration Center 10 network that are LNP-capable intermediate networks as is shown in the shaded oval 30 of FIG. 7. There are 'n' intermediate networks shown in FIG. 7 and respective network M-Action Request and Response messages are shown by arrows only. The up dating of individual intermediate networks would require tracking and may be achieved with the CMISE/CMIP protocol by sending respective M-ACTION messages with a different invoke identifiers to allow tracking of each transaction.

After receiving successful M-ACTION Response messages for all invoke identifiers that were sent to corresponding intermediate networks, the central LNP Administration Center 10 would finally proceed to update the LNP GTT node(s) in the 'Ported From' network (Network A).

FIG. 6 illustrates the final provisioning step of the updating sequence performed by the Central LNP Administration Center 10, i.e. the updating of the 'Ported From' network (Network A). The Central LNP Administration Center 10 may preferably update the 'Ported From' network LNP GTT node 20A in substantially the identical manner as for the 'Ported TO' networks LNP GTT node 20B of FIG. 4 and hence the description above associated with FIG. 4 equally applies for FIG. 6. However as the 'Ported From' network is the last network in the sequence to require updating, the LNP Administration Center 10 may not require the 'Ported From' Networks local SMS 12A to reply with an indication whether the transaction was successful. This would be achieved by the LNP Administration Center 10 sending an 'M-Action' message with the message mode flag not set to thus indicate to the local SMS 12A that it is not required to provide an acknowledgement (M-Action Response message) indicating whether the transaction was successful. In a similar manner a network response to message 27A would also not be required.

Where the LNP Administration Center 10 receives a successful M-ACTION Response message (not shown) for the 'Ported From' network transaction, an 'A-RELEASE' message may be broadcast using the Association Control Service Element (ACSE) protocol to all local SMSs 12A, 12B, 12C so as to close the communication links. The sequential updating of all networks supported by the Central LNP Administration Center 10 is completed for this particular porting example and looping of LNP related signalling messages should be avoided.

If however a call is encountered at any time during this provisioning process, how the routing will take place will depend upon which network the call originates from and whether that network has been updated.

For example if the call originates from within Network B (the "ported to" network which already has the new GTT data), the routing will be correct and will lead to the new subscriber LIDB service in Network B and no message looping will occur.

If however a call is encountered at the 'Ported From' network, i.e. Network A (unlike FIG. 3, Network A is not yet updated) the old GTT at Network A's STP will be used to route it to the old LIDB service where the message will either be discarded or a treatment will be applied for this subscriber and message looping will not occur.

Where a non-LNP-capable network launches a query via Network C which still has an old GTT data, the routing will take place via Network's A STP as the "ported from" network (Network A) is the very last to be updated). This routing will lead to the old LIDB service where the message will be discarded or a treatment will be applied for this subscriber and message looping will again not occur.

As can be seen from the above description provisioning of networks which include intermediate networks supported by a central administration center in the predetermined manner and sequence described can advantageously prevent signalling messages from looping between non-synchronized networks. The provisioning sequence works equally well where only two networks are involved, i.e. the ported from and ported to networks. Significant savings can be realized at the network element level as the only development required is at the SMS and NPAC level.

Numerous modifications, variations and adaptation may be made to the particular embodiment of the invention described herein without departing from the scope of the invention defined by the claims.

What is claimed is:

1. In a communications network comprising a plurality of service provider networks each supported by and communicating with a central administration center over separate communication links, a method of provisioning the communications network with updated signalling routing data comprising the steps of:

in response to receiving a porting request to port a directory number (DN) served by a first Service Provider network to a second Service Provider network, the central administration center over respective communication links first sending updated signalling routing data reflecting the porting change toward the second Service Provider network;

in response to receiving a confirmation message that the second Service Provider network has been updated with the routing data, the central administration center over respective communication links then sending updated routing data reflecting the porting change toward at least one intermediate Service Provider network; and in response to receiving a confirmation message that each intermediate Service Provider network has been updated with signalling routing data, the central administration center over a communication link then sending updated signalling routing data reflecting the porting change toward the first Service provider-network.

2. The method of provisioning as claimed in claim 1 wherein the step of sending updated routing data toward each intermediate SP network comprises the step of the central administration center broadcasting over respective communication links the routing data toward each intermediate SP network.

3. The method of provisioning as claimed in claim 1 wherein the communications network further comprises a local service management system node for each SP network disposed between the central administration center and the respective service provider network for providing a communication interface there between, respective local SMSs receiving the routing data sent by the central administration center and for sending respective confirmation messages to the central administration center.

4. The method of provisioning as claimed in claim 2 wherein the communications network further comprises a local service management system node for each SP network disposed between the central administration center and the respective service provider network for providing a communication interface there between, respective local SMSs receiving the routing data sent by the central administration center and for sending respective confirmation messages to the central administration center.

5. The method as claimed in claim 4 wherein the routing data is received in a message also having a corresponding sequence number and wherein respective SMSs include said sequence number in respective confirmation messages sent to the the central administration center.

6. In a communications network comprising two or more service provider networks, a central administration center, and a local service management system for each service provider network disposed between the central administration center and the respective service provider network for providing a communication interface there between, a method of provisioning a service provider network with updated signalling routing data comprising the step of:

in response to a service management system receiving a message from the central administration center, the received message comprising updated signalling routing data reflecting a porting change, and the received message further comprising a sequence number associated with the received message, the service management system then sending a confirmation message after updating the respective service provider network with the updated signalling routing data, the confirmation message including the sequence number associated with the received message to the central administration center for tracking purposes.

* * * * *